(12) United States Patent
Chen

(10) Patent No.: US 10,852,884 B2
(45) Date of Patent: Dec. 1, 2020

(54) TOUCH DEVICE

(71) Applicant: WUHAN CHINA STAR OPTOELECTRONICS SEMICONDUCTOR DISPLAY TECHNOLOGY CO., LTD., Hubei (CN)

(72) Inventor: Bi Chen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/467,999

(22) PCT Filed: Mar. 26, 2019

(86) PCT No.: PCT/CN2019/079614
§ 371 (c)(1),
(2) Date: Jun. 10, 2019

(87) PCT Pub. No.: WO2020/113859
PCT Pub. Date: Jun. 11, 2020

(65) Prior Publication Data
US 2020/0201506 A1 Jun. 25, 2020

(51) Int. Cl.
*G06F 3/041* (2006.01)
(52) U.S. Cl.
CPC .............................. *G06F 3/04164* (2019.05)

(58) Field of Classification Search
CPC .................................................. G06F 3/04164
See application file for complete search history.

(56) References Cited

U.S. PATENT DOCUMENTS

| 2014/0015563 | A1  | 1/2014 | Kao et al. |
| 2016/0188059 | A1* | 6/2016 | Lee ........................ G06F 3/0416 345/173 |
| 2018/0233542 | A1  | 8/2018 | Choi et al. |

FOREIGN PATENT DOCUMENTS

| CN | 102819353 A | 12/2012 |
| CN | 203414925 U | 1/2014 |
| CN | 203588244 U | 5/2014 |
| CN | 106339132 A | 1/2017 |
| CN | 107037915 A | 8/2017 |

\* cited by examiner

*Primary Examiner* — Sahlu Okebato
(74) *Attorney, Agent, or Firm* — Mark M. Friedman

(57) ABSTRACT

A touch device is provided. The touch device has a flexible circuit board disposed inside a bottom frame of the touch device and having a plurality of electrical connection pads to electrically connect a plurality of sensing circuits and electrically connect a plurality of driving circuits, wherein at least one of the plurality of sensing circuits is connected with one of the plurality of electrical connection pads through a bottom portion of the plurality of electrical connection pads, and at least one of the plurality of driving circuits is connected with one of the plurality of electrical connection pads through a top portion of the plurality of electrical connection pads.

10 Claims, 3 Drawing Sheets

TOUCH DEVICE

FIELD OF DISCLOSURE

The present disclosure relates to touch devices, and more particularly to a touch device with a bottom frame having a reduced width.

BACKGROUND OF DISCLOSURE

In conventional touch display screens, FIG. 1 shows a conventional wiring design. A sensing circuit (RX) 2 and a driving circuit (TX) 3 are finally concentrated on a bottom frame of the touch display screens and electrically connected to a flexible circuit board (FPC) 1. In order to avoid signal interference, the circuit of RX and the circuit of TX cannot overlap, and a distance between them is also limited. Therefore, a width of the bottom frame of the touch display cannot be reduced, which limits development space of the touch screens with a narrow frame.

Therefore, it is necessary to provide a touch device capable of reducing width of the bottom frame to solve the problems existing in the prior art.

SUMMARY OF DISCLOSURE

In conventional touch display screens, FIG. 1 shows a conventional wiring design. A sensing circuit (RX) 2 and a driving circuit (TX) 3 are finally concentrated on a bottom frame of the touch display screens and electrically connected to a flexible circuit board (FPC) 1. In order to avoid signal interference, the circuit of RX and the circuit of TX cannot overlap, and a distance between them is also limited. Therefore, a width of the bottom frame of the touch display cannot be reduced, which limits development space of the touch screens with a narrow frame.

A main object of the present disclosure is to provide a touch device in which wiring positions of a sensing line circuit and a driving circuit are disposed on two opposite sides of a soldering pad on a flexible circuit board, respectively. Enlarged wiring space is created by using the soldering pad. At the same time, a width of a bottom frame of the touch device is reduced, and the sensing circuit is completely separated from the driving circuit, thereby improving a signal-to-noise ratio of the touch device.

To achieve the above object of the present disclosure, an embodiment of the present disclosure provides a touch device comprising a flexible circuit board disposed inside a bottom frame of the touch device and comprising a plurality of electrical connection pads configured to electrically connect a plurality of sensing circuits and electrically connect a plurality of driving circuits, wherein at least one of the plurality of sensing circuits is connected with one of the plurality of electrical connection pads through a bottom portion of the plurality of electrical connection pads, and at least one of the plurality of driving circuits is connected with one of the plurality of electrical connection pads through a top portion of the plurality of electrical connection pads.

In an embodiment of the present disclosure, the plurality of sensing circuits are laterally distributed within the touch device and extend downwardly along a left frame and a right frame of the touch device to be gathered inside the bottom frame of the touch device.

In an embodiment of the present disclosure, the plurality of driving circuits are longitudinally distributed within the touch device and extend to be inside the bottom frame of the touch device.

In an embodiment of the present disclosure, the plurality of electrical connection pads comprise a first connection pad, a second connection pad, and a third connection pad, wherein the first connection pad is located between the second connection pad and the third connection pad, the first connection pad is connected with one of the driving circuits, and the second connection pad and the third connection pad are connected with two of the plurality of sensing circuits, respectively.

In an embodiment of the present disclosure, the flexible circuit board comprises a bending region located between the plurality of electrical connection pads and the bottom frame of the touch device.

In an embodiment of the present disclosure, the plurality of sensing circuits are correspondingly connected with the plurality of electrical connection pads in a one to one manner through the bottom portion of the plurality of electrical connection pads, and the plurality of driving circuits are correspondingly connected with the plurality of electrical connection pads in a one to one manner through the top portion of the plurality of electrical connection pads.

To achieve the above object, another embodiment of the present disclosure provides a touch device comprising a flexible circuit board disposed inside a bottom frame of the touch device and comprising a plurality of electrical connection pads configured to electrically connect a plurality of sensing circuits and electrically connect a plurality of driving circuits, wherein at least one of the plurality of sensing circuits is connected with one of the plurality of electrical connection pads through a bottom portion of the plurality of electrical connection pads, and at least one of the plurality of driving circuits is connected with one of the plurality of electrical connection pads through a top portion of the plurality of electrical connection pads, wherein the plurality of electrical connection pads comprise a first connection pad, a second connection pad, and a third connection pad, wherein the first connection pad is located between the second connection pad and the third connection pad, the first connection pad is connected with one of the driving circuits, and the second connection pad and the third connection pad are connected with two of the plurality of sensing circuits, respectively.

In an embodiment of the present disclosure, the flexible circuit board comprises a bending region located between the plurality of electrical connection pads and the bottom frame of the touch device.

In an embodiment of the present disclosure, the plurality of sensing circuits are laterally distributed within the touch device and extend downwardly along a left frame and a right frame of the touch device to be gathered inside the bottom frame of the touch device.

In an embodiment of the present disclosure, the plurality of driving circuits are longitudinally distributed within the touch device and extend to be inside the bottom frame of the touch device.

In an embodiment of the present disclosure, the plurality of sensing circuits are correspondingly connected with the plurality of electrical connection pads in a one to one manner through the bottom portion of the plurality of electrical connection pads, and the plurality of driving circuits are correspondingly connected with the plurality of electrical connection pads in a one to one manner through the top portion of the plurality of electrical connection pads.

To achieve the above object, a further embodiment of the present disclosure provides a touch device comprising a flexible circuit board disposed inside a bottom frame of the touch device and comprising a plurality of electrical connection pads configured to electrically connect a plurality of sensing circuits and electrically connect a plurality of driving circuits, wherein the plurality of sensing circuits are correspondingly connected with the plurality of electrical connection pads in a one to one manner through a bottom portion of the plurality of electrical connection pads, and the plurality of driving circuits are correspondingly connected with the plurality of electrical connection pads in a one to one manner through a top portion of the plurality of electrical connection pads, wherein the flexible circuit board comprises a bending region located between the plurality of electrical connection pads and the bottom frame of the touch device.

In an embodiment of the present disclosure, the plurality of sensing circuits are laterally distributed within the touch device and extend downwardly along a left frame and a right frame of the touch device to be gathered inside the bottom frame of the touch device.

In an embodiment of the present disclosure, the plurality of driving circuits are longitudinally distributed within the touch device and extend to be inside the bottom frame of the touch device.

In an embodiment of the present disclosure, the plurality of electrical connection pads comprise a first connection pad, a second connection pad, and a third connection pad, wherein the first connection pad is located between the second connection pad and the third connection pad, the first connection pad is connected with one of the driving circuits, and the second connection pad and the third connection pad are connected with two of the plurality of sensing circuits, respectively.

An embodiment of the present disclosure is to provide a touch device in which wiring positions of a sensing line circuit and a driving circuit are disposed on two opposite sides of a soldering pad on a flexible circuit board, respectively. Enlarged wiring space is created by using the soldering pad. At the same time, a width of a bottom frame of the touch device is reduced, and the sensing circuit is completely separated from the driving circuit, thereby improving a signal-to-noise ratio of the touch device.

DETAILED DESCRIPTION OF PREFERRED EMBODIMENTS

The following description of the embodiments with reference to the appended drawings is used for illustrating specific embodiments which may be used for carrying out the present disclosure. Further, the directional terms described by the present disclosure, such as upper, lower, top, bottom, front, back, left, right, inner, outer, side, surrounding, central, horizontal, lateral, vertical, longitudinal, axial, radial, uppermost or lowermost, etc. are only directions by referring to the accompanying drawings. Thus, the used directional terms are used to describe and understand the present disclosure, but the present disclosure is not limited thereto.

Figure 1:
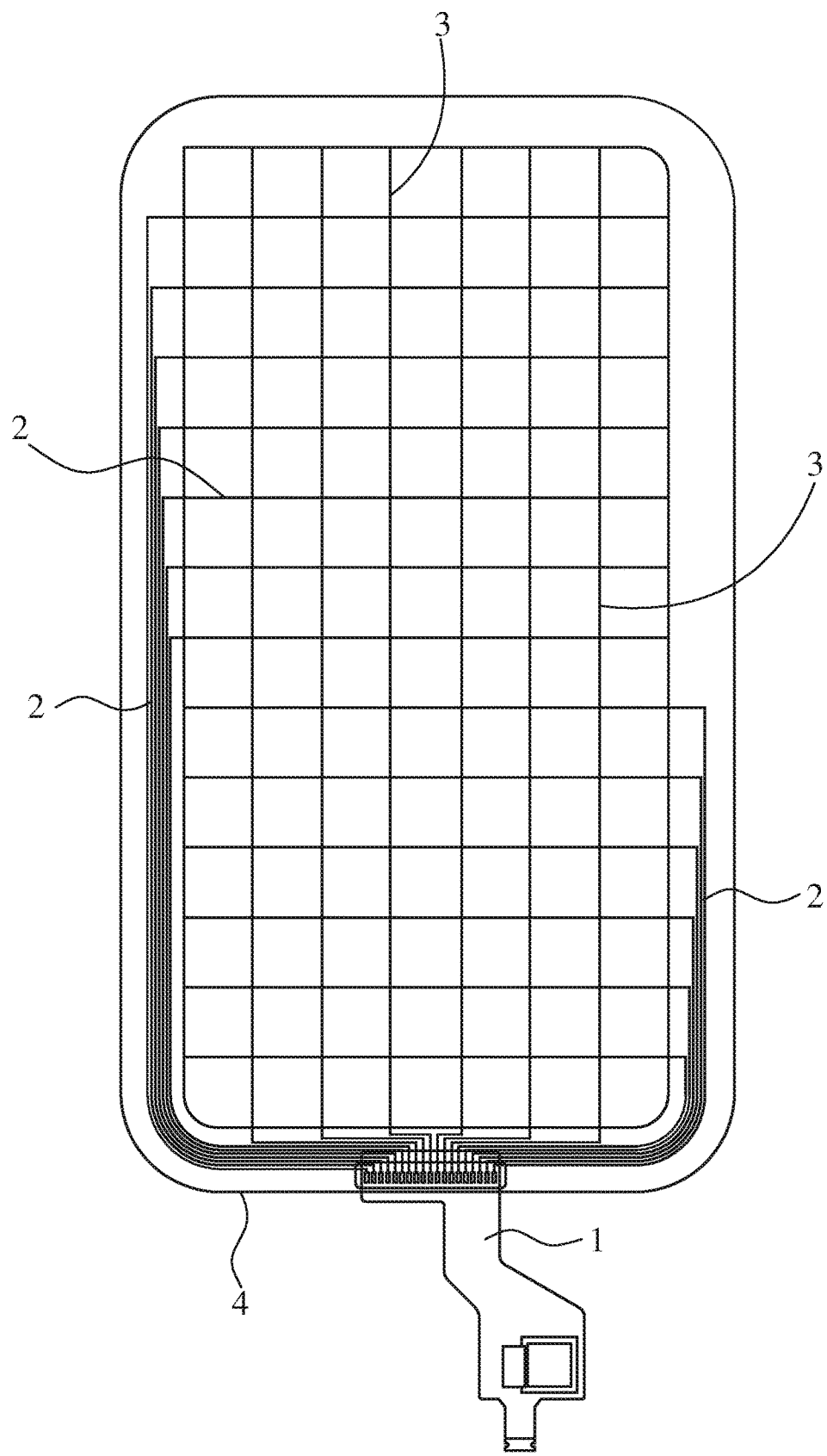
FIG. 1 is a wiring schematic diagram of a sensing circuit and a driving circuit of a conventional touch device.
Figure 2:
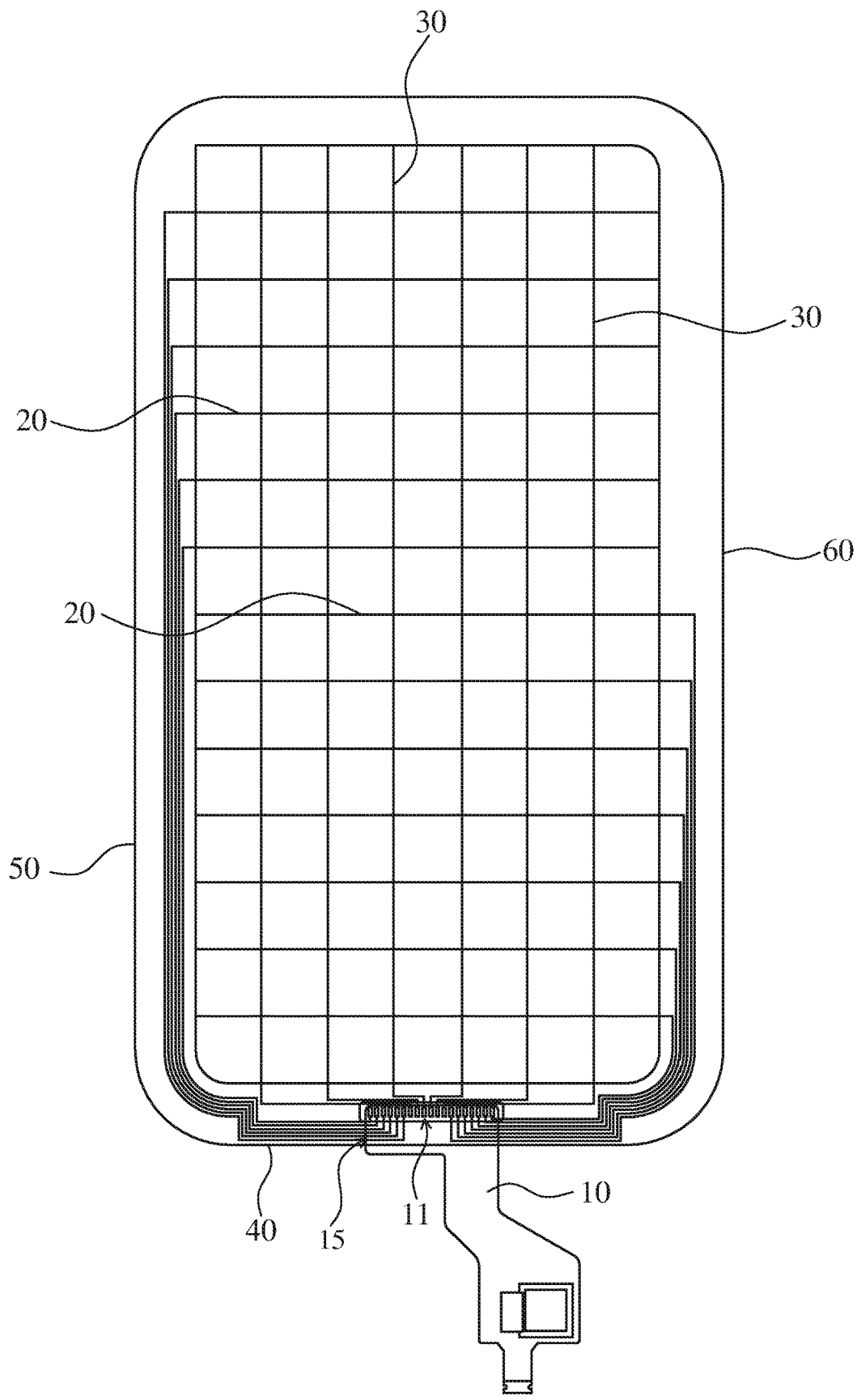
FIG. 2 is a wiring schematic diagram of a sensing circuit and a driving circuit of a touch device according to an embodiment of the present disclosure.

FIG. 2 shows a touch device according to an embodiment of the present disclosure. The touch device comprises a flexible circuit board 10 disposed inside a bottom frame 40 of the touch device. The flexible circuit board 10 comprises a plurality of electrical connection pads 11 configured to electrically connect a plurality of sensing circuits 20 and electrically connect a plurality of driving circuits 30. The plurality of sensing circuits 20 are laterally distributed within the touch device and extend downwardly along a left frame 50 and a right frame 60 of the touch device to be gathered inside the bottom frame 40 of the touch device. Preferably, the plurality of driving circuits 30 are longitudinally distributed within the touch device and extend to be inside the bottom frame 40 of the touch device.

Figure 3:
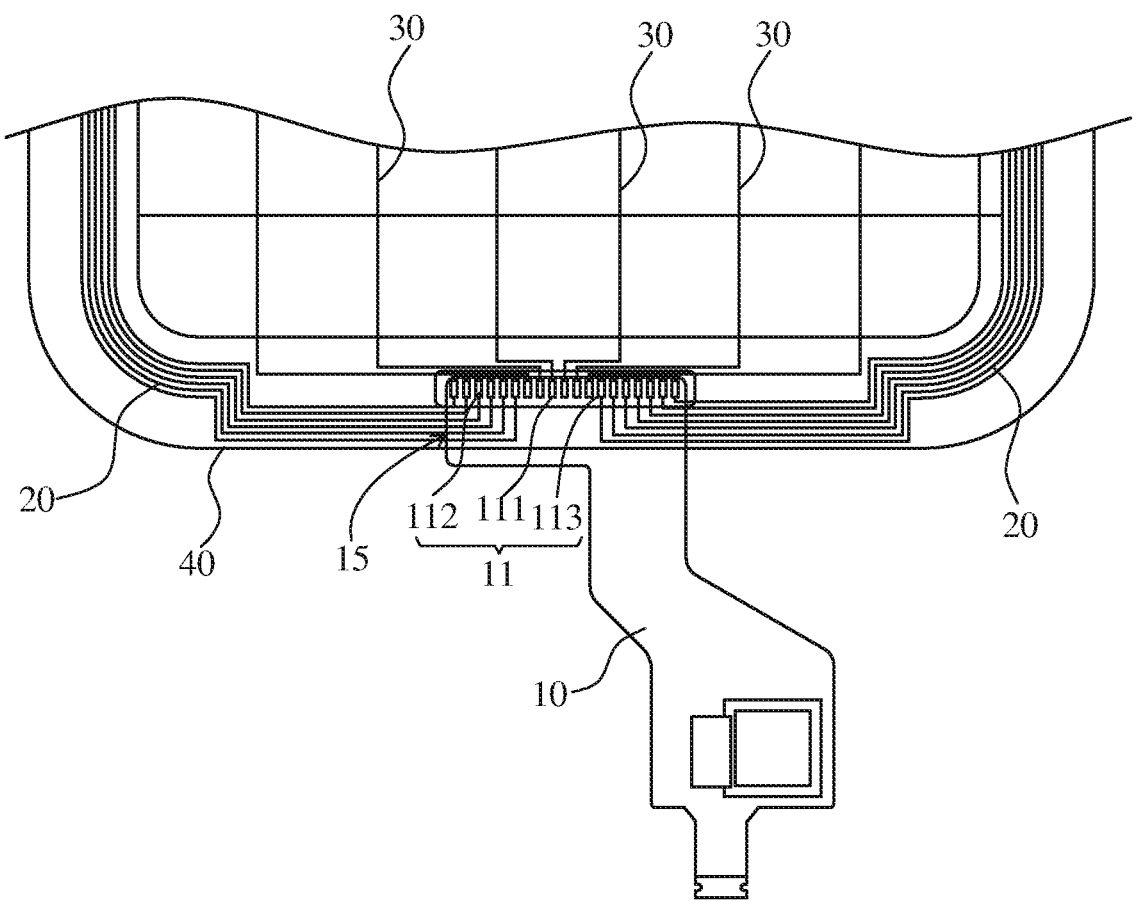
FIG. 3 is a partial enlarged view of a vicinity of a bottom frame of the touch device in FIG. 2.

Refer to FIG. 3, which is a partial enlarged view of a vicinity of a bottom frame 40 of the touch device in FIG. 2. As shown in FIG. 3, at least one of the plurality of sensing circuits 20 is connected with one of the plurality of electrical connection pads 11 through a bottom portion of the plurality of electrical connection pads 11. In the present embodiment, at least one of the plurality of driving circuits 30 is connected with one of the plurality of electrical connection pads 11 through a top portion of the plurality of electrical connection pads 11. That is, the plurality of driving circuits 30 and the plurality of sensing circuits 20 are guided above and below the plurality of electrical connection pads 11, respectively. In this way, space occupied by the electrical connection pads 11 can be utilized to separate the driving circuits 30 from the sensing circuits 20. In particular, in a longitudinal distance, space originally used to prevent the driving circuits 30 and the sensing circuits 20 from interlacing with each other can be reduced, so that a total width occupied by the bottom frame 40 can be reduced.

In an embodiment, the plurality of electrical connection pads 11 comprise a first connection pad 111, a second connection pad 112, and a third connection pad 113. The first connection pad 111 is located between the second connection pad 112 and the third connection pad 113. Preferably, the first connection pad 111 is connected with one of the driving circuits 30, and the second connection pad 112 and the third connection pad 113 are connected with two of the plurality of sensing circuits 20, respectively.

In an embodiment of the present disclosure, the flexible circuit board 10 comprises a bending region 15 located between the plurality of electrical connection pads 11 and the bottom frame 40 of the touch device.

In an embodiment of the present disclosure, the plurality of sensing circuits 20 also can be correspondingly connected with the plurality of electrical connection pads 11 in a one to one manner through the bottom portion of the plurality of electrical connection pads 11, and simultaneously, the plurality of driving circuits 30 are correspondingly connected with the plurality of electrical connection pads 11 in a one to one manner through the top portion of the plurality of electrical connection pads 11. However, the present disclosure is not limited to the foregoing connection manner. Depending on a different design, a part of the plurality of electrical connection pads 11 may be connected to the plurality of sensing circuits 20 through the bottom portion of the plurality of electrical connection pads 11. Another part of the plurality of electrical connection pads 11 is connected to the plurality of driving circuits 30 through the top portion, as long as the top and bottom portions of the plurality of electrical connection pads 11 can be fully utilized for the connection configuration of the wires.

The present disclosure has been described in relative embodiments described above, but the above embodiments are merely examples for implementing the present disclosure. It is noted that the disclosed embodiments do not limit the scope of the disclosure. On the contrary, modifications and equal settings included in the spirit and scope of the claims are all included in the scope of the present disclosure.

The invention claimed is:

1. A touch device, comprising:
a flexible circuit board disposed inside a bottom frame of the touch device and comprising a plurality of electrical connection pads configured to electrically connect a plurality of sensing circuits and electrically connect a plurality of driving circuits,
wherein the plurality of sensing circuits are correspondingly connected with the plurality of electrical connection pads in a one to one manner through a bottom portion of the plurality of electrical connection pads, and the plurality of driving circuits are correspondingly connected with the plurality of electrical connection pads in a one to one manner through a top portion of the plurality of electrical connection pads.

2. The touch device according to claim 1, wherein the plurality of sensing circuits are laterally distributed within the touch device and extend downwardly along a left frame and a right frame of the touch device to be gathered inside the bottom frame of the touch device.

3. The touch device according to claim 1, wherein the plurality of driving circuits are longitudinally distributed within the touch device and extend to be inside the bottom frame of the touch device.

4. A touch device, comprising: a flexible circuit board disposed inside a bottom frame of the touch device and comprising a plurality of electrical connection pads configured to electrically connect a plurality of sensing circuits and electrically connect a plurality of driving circuits,
wherein the plurality of sensing circuits are correspondingly connected with the plurality of electrical connection pads in a one to one manner through a bottom portion of the plurality of electrical connection pads, and the plurality of driving circuits are correspondingly connected with the plurality of electrical connection pads in a one to one manner through a top portion of the plurality of electrical connection pads, wherein the plurality of electrical connection pads comprise a first connection pad, a second connection pad, and a third connection pad, wherein the first connection pad is located between the second connection pad and the third connection pad, the first connection pad is connected with one of the driving circuits, and the second connection pad and the third connection pad are connected with two of the plurality of sensing circuits, respectively.

5. The touch device according to claim 4, wherein the plurality of sensing circuits are laterally distributed within the touch device and extend downwardly along a left frame and a right frame of the touch device to be gathered inside the bottom frame of the touch device.

6. The touch device according to claim 4, wherein the plurality of driving circuits are longitudinally distributed within the touch device and extend to be inside the bottom frame of the touch device.

7. A touch device, comprising:
a flexible circuit board disposed inside a bottom frame of the touch device and comprising a plurality of electrical connection pads configured to electrically connect a plurality of sensing circuits and electrically connect a plurality of driving circuits,
wherein the plurality of sensing circuits are correspondingly connected with the plurality of electrical connection pads in a one to one manner through a bottom portion of the plurality of electrical connection pads, and the plurality of driving circuits are correspondingly connected with the plurality of electrical connection pads in a one to one manner through a top portion of the plurality of electrical connection pads, wherein the flexible circuit board comprises a bending region located between the plurality of electrical connection pads and the bottom frame of the touch device.

8. The touch device according to claim 7, wherein the plurality of sensing circuits are laterally distributed within the touch device and extend downwardly along a left frame and a right frame of the touch device to be gathered inside the bottom frame of the touch device.

9. The touch device according to claim 7, wherein the plurality of driving circuits are longitudinally distributed within the touch device and extend to be inside the bottom frame of the touch device.

10. The touch device according to claim 7, wherein the plurality of electrical connection pads comprise a first connection pad, a second connection pad, and a third connection pad, wherein the first connection pad is located between the second connection pad and the third connection pad, the first connection pad is connected with one of the driving circuits, and the second connection pad and the third connection pad are connected with two of the plurality of sensing circuits, respectively.

* * * * *

UNITED STATES PATENT AND TRADEMARK OFFICE
CERTIFICATE OF CORRECTION

PATENT NO. : 10,852,884 B2
APPLICATION NO. : 16/467999
DATED : December 1, 2020
INVENTOR(S) : Bi Chen It is certified that error appears in the above-identified patent and that said Letters Patent is hereby corrected as shown below:

On the Title Page

Item (30) should be added as follows:
Foreign Application Priority Data
Dec. 6, 2018 (CN).............................. 201811484515.8

Signed and Sealed this
Twenty-seventh Day of December, 2022

Katherine Kelly Vidal
*Director of the United States Patent and Trademark Office*